(12) United States Patent
Malgorn et al.

(10) Patent No.: US 9,573,087 B2
(45) Date of Patent: Feb. 21, 2017

(54) FILTER HAVING A FILTER CARTRIDGE, AND CORRESPONDING FILTER CARTRIDGE

(71) Applicant: Cummins Filtration IP, Inc., Columbus, IN (US)

(72) Inventors: Gerard Malgorn, Quimper (FR); Ismail Bagci, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 900 days.

(21) Appl. No.: 13/636,144

(22) Filed: Sep. 20, 2012

(65) Prior Publication Data

US 2014/0083951 A1 Mar. 27, 2014

Related U.S. Application Data

(63) Continuation-in-part of application No. PCT/FR2012/050705, filed on Mar. 30, 2012.

(51) Int. Cl.
| | | |
|---|---|---|
| *B01D 35/147* | (2006.01) | |
| *B01D 35/16* | (2006.01) | |

(52) U.S. Cl.
CPC ......... *B01D 35/1475* (2013.01); *B01D 35/147* (2013.01); *B01D 35/16* (2013.01); *B01D 2201/0415* (2013.01); *B01D 2201/162* (2013.01); *B01D 2201/295* (2013.01); *B01D 2201/305* (2013.01); *B01D 2201/316* (2013.01); *B01D 2201/34* (2013.01)

(58) Field of Classification Search
None
See application file for complete search history.

(56) References Cited

U.S. PATENT DOCUMENTS

| | | | |
|---|---|---|---|
| 5,770,054 A | 6/1998 | Ardes | |
| 6,012,485 A | 1/2000 | Connelly et al. | |
| 6,579,448 B2 | 6/2003 | Dworatzek | |
| 8,298,409 B2 * | 10/2012 | Pflueger et al. | 210/130 |
| 2008/0035540 A1 | 2/2008 | Pflueger et al. | |
| 2008/0308486 A1* | 12/2008 | Hacker | B01D 29/21 210/440 |
| 2009/0057218 A1 | 3/2009 | Hanase et al. | |
| 2011/0220563 A1* | 9/2011 | Sakraschinsky et al. | 210/130 |

FOREIGN PATENT DOCUMENTS

| | | |
|---|---|---|
| CN | 1269733 | 10/2000 |
| DE | 200 04 431 | 6/2000 |
| WO | WO-2005/007267 | 1/2005 |
| WO | WO-2011/151174 | 12/2011 |

OTHER PUBLICATIONS

The Chinese Office Action issued in Chinese Application No. 201310047344.3, dated Apr. 16, 2015.

* cited by examiner

*Primary Examiner* — Terry Cecil
(74) *Attorney, Agent, or Firm* — Foley & Lardner LLP

(57) ABSTRACT

A filter assembly includes a filter body, a removable filter cartridge, and a bypass valve with incinerable and non-incinerable portions. The bypass valve includes a valve seat and a movable valve closure element removable with the removable filter cartridge and incinerable. The bypass valve includes a return member remaining in the filter body. A method is provided for controlling bypass valve-opening threshold pressure.

26 Claims, 5 Drawing Sheets

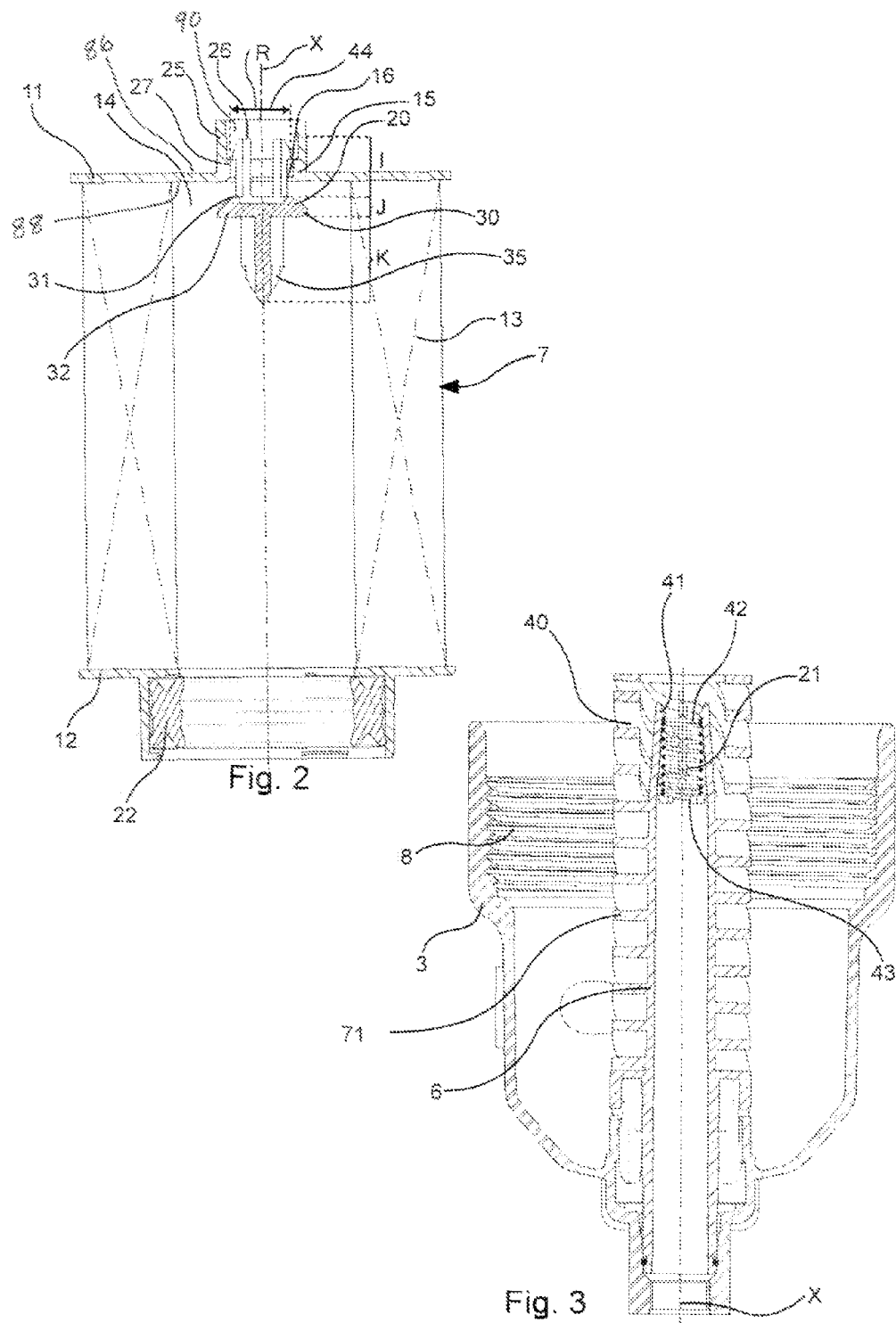

Figure 1:
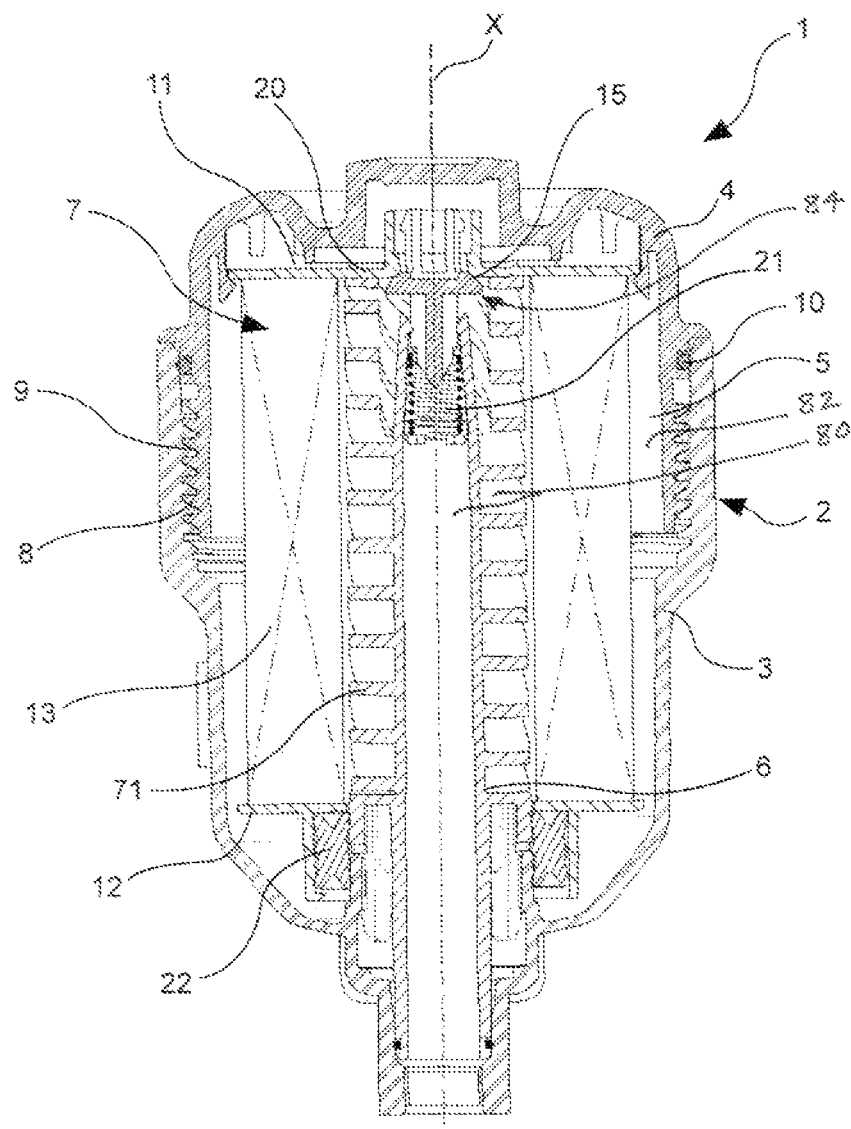

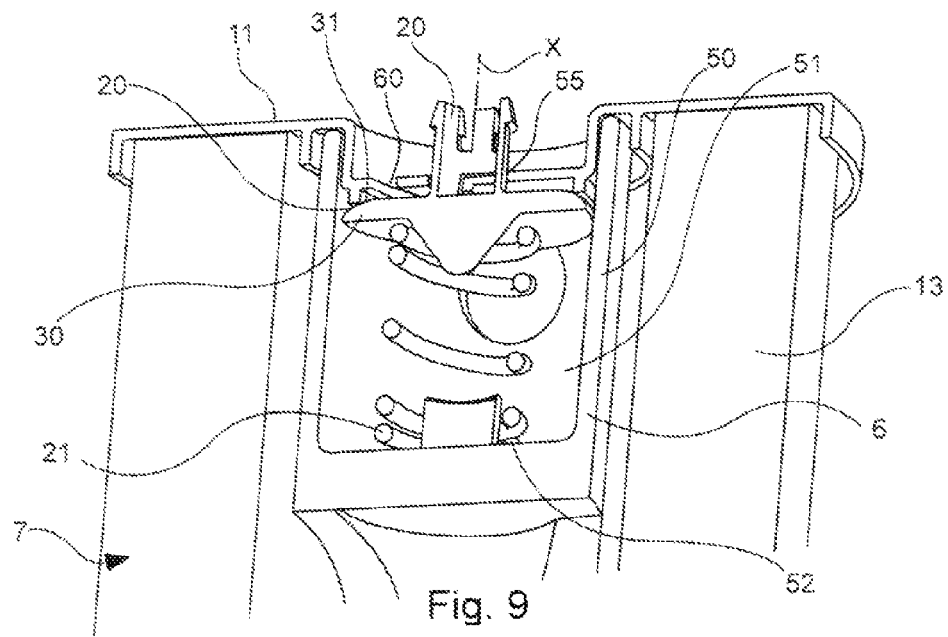
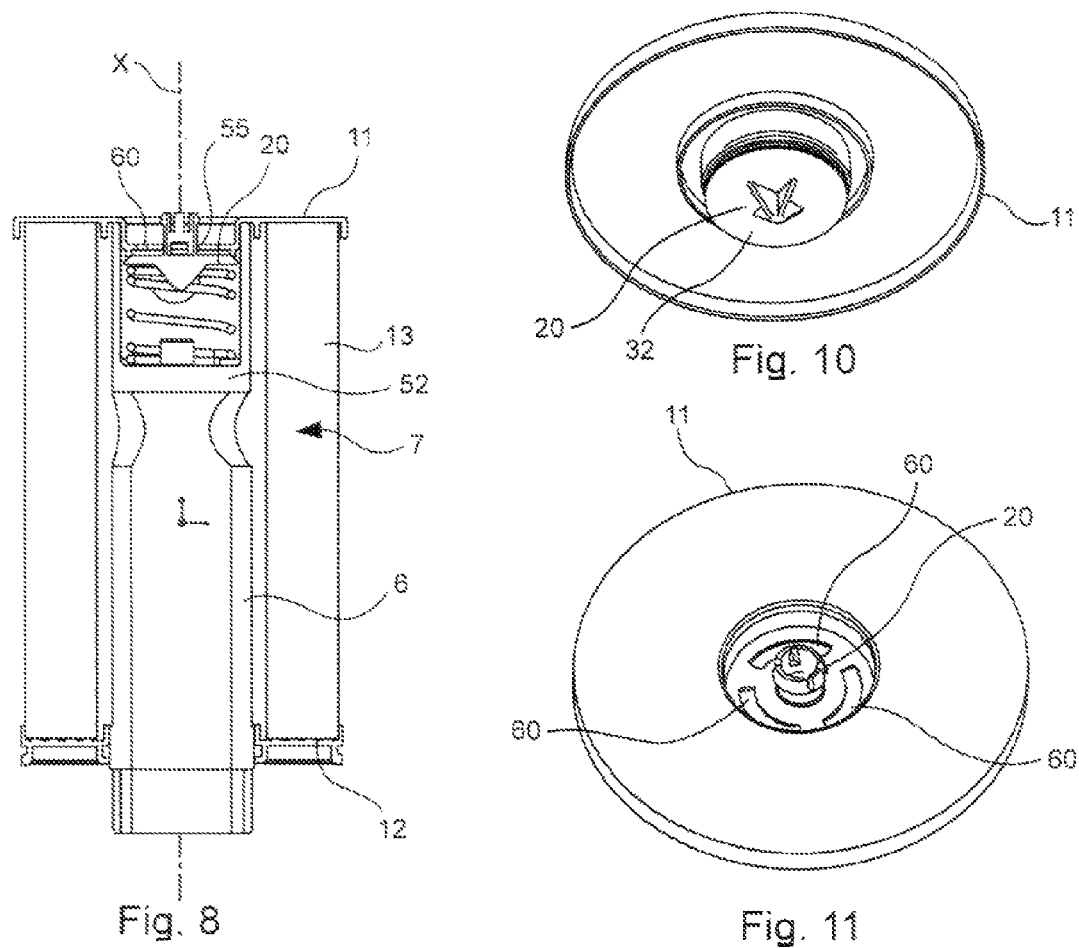

FILTER HAVING A FILTER CARTRIDGE, AND CORRESPONDING FILTER CARTRIDGE

CROSS-REFERENCE TO RELATED APPLICATION

This application is a continuation-in-part of International Patent Application No. PCT/FR2012/050705, filed Mar. 30, 2012, incorporated herein by reference.

PARENT INTERNATIONAL APPLICATION

The following is an English translation in accordance with the above noted parent international application and the present disclosure.

FIELD OF DISCLOSURE

The disclosure relates to the field of the designing and making of filter assemblies used to filter fluids, including fluids flowing in hydraulic motors or apparatuses.

Such filtering assemblies consist of a filter element, comprising a vessel and a cover, within which there is disposed a filter cartridge comprising a filtering medium, generally cylindrical in shape and surrounding a tubular hollow space, the filtering medium being made for example of paper, cardboard or again felt or another porous material, such as a synthetic non-woven material. The filter cartridge also has two end plates or flanges demarcating the filtering medium.

Such filter cartridges generally cooperate with a tube, in particular a center tube, which may or may not be fixedly joined to the flanges. The external diameter of the tube is close to the internal diameter of the tubular hollow space surrounded by the filtering medium, so as to limit the deformations of the medium caused by the pressure exerted within the filter assembly.

The end flanges are formed by a first flange, which may consist of an upper flange, and by a second flange, which may consist of a lower flange. The role of the flanges is to participate in the tight sealing of the filter cartridge and to enable the fixed joining of the filter cartridge to the permanent part of the filter assembly.

PRIOR ART SOLUTIONS

The U.S. Pat. No. 5,770,054 describes a filter assembly, the center tube of which houses a valve closure element and a return member while the filter cartridge, in its upper flange, defines a surface forming a valve seat surrounding an aperture. The closure element is positioned so as to come into contact with the valve body, in a sealing position. When the filter cartridge is being replaced, the valve seat is replaced, while the closure element and the return member remain permanently on the center tube. One drawback of such a system is that the closure element in the sealing area is fouled and remains fouled, even with the changing of the filter cartridge.

There are other known filter assemblies where the safety valve comprising the valve body, the closure element and the return member form entirely part of the filter cartridge. Such assemblies generate high maintenance costs. The filter cartridge is then not incinerable.

GOALS OF THE DISCLOSURE

The disclosure in one aspect is aimed especially at entirely or partly overcoming these drawbacks of the prior art.

More specifically, it is a goal of the disclosure to provide a filter assembly that performs well while at the same time limiting the cost of maintaining and replacing the filter cartridge.

It is yet another goal of the disclosure to provide an incinerable filter cartridge, in particular without metal parts.

It is yet another goal of the disclosure to provide a filter cartridge which is adaptable to threshold pressures for opening different valves, without modifying the rest of the filter assembly.

It is thus a goal of the disclosure to provide a user with the possibility of choosing a type of filter cartridge according to the desired valve-opening threshold pressure without modifying the permanent part of the filter assembly.

SUMMARY OF THE DISCLOSURE

The disclosure meets all or a part of these goals by means of a filter assembly for filtering at least one fluid, including a fluid flowing especially in a hydraulic motor or apparatus, comprising:
  a filter body,
  a tube within the filter body,
  a detachable filter cartridge housed in the filter body and comprising:
    a first flange and a second flange,
    a filtering medium having a tubular cavity to surround the tube and extending between the first and the second flanges, the first flange comprising a valve seat crossed by at least one orifice communicating with the tubular cavity, and
    a valve closure element fixedly joined to the first flange so as to cooperate with the valve seat, the closure element being configured to occupy at least two positions, namely a closed position in which the closure element closes off the valve seat and at least one open position in which the closure element enables the passage of fluid through the valve seat,
  a return member distinct from the filter cartridge configured to act by biasing the closure element into the closed position.

Through the disclosure, the filter cartridge comprises both the closure element and the valve seat in such a way that this assembly of two parts soiled during the use of the filter assembly is replaced by the filter cartridge.

It must be noted that the return member belongs to the permanent part of the filter assembly as does the filter body and the tube, in particular the center tube situated within the filter body.

Another advantage of the disclosure is that modifying the dimensions of the closure element alone can make it possible to modify the threshold pressure for opening the valve formed by the valve seat, the closure element and the return member, according to the user's wishes, without in any way affecting the permanent part of the filter assembly. A same filter assembly will thus be modified in its performance, it being necessary then to modify not the permanent part but only the detachable part of the filter assembly, namely the filter cartridge.

According to one particular embodiment, the first flange comprises an aperture, especially a circular aperture, within which the closure element is retained while at the same time being mobile in translation between a position corresponding to the closed position and a position corresponding to an open position of the valve.

Thus, the first flange and the closure element cooperate so as to enable the closure element to fulfill its function of opening and closing the valve as a function of the pressure exerted by the fluid on the closure element and, in reaction, the force of the return member exerted oppositely on the closure element. It is the return member that forces the closure element into the closed position when the pressure exerted oppositely on the closure element is below a predetermined pressure threshold.

In this case, the aperture can for example be demarcated by a tubular portion and an element protruding from the closure element can abut an inner shoulder of the tubular portion during the mounting. This sets a limit on the opening of the closure element in the maximum open position, during assembly, and retains the closure element on the first flange and therefore on the filter cartridge. During use, it can happen that this maximum open position cannot be achieved, a clearance possibly having to be made between the closure element and the protruding element. To this end, the closure element can for example be retained in resting on the tube to make this clearance and prevent the closure element from reaching the maximum open position.

The aperture can for example, in this case, at least partially coincide with the orifice passing through the valve seat and closed off by the closure element in its closed position.

It must be noted that there can be several orifices passing through the valve seat or a single orifice closed off by the closing-off surface when the closure element is in the closing-off position or the closed position.

In another example, the aperture is distinct from said at least one orifice passing through the valve seat and through which the fluid can pass in the open position of the closure element.

The closure element may comprise a skirt having the closing-off surface capable of coming into contact with the valve seat in the closed position of the closure element.

The tube can be at least partially hollow and the return member can be mounted in the tube.

According to a preferred embodiment, the return member comprises a spring especially a coil spring. However, the invention is not limited to a coil spring. In particular, the return member may comprise a leaf-spring or an elastic material.

In one particular embodiment, the tube of the filter assembly may have an unattached end at least partially forming an edge extending diametrically inwards so as to retain the return member abutting said edge.

The tube, in one variant, may, in an unattached end part, comprise a housing configured to house and hold the return member without however preventing it from fulfilling its role of biasing the closure element into the closed position.

The closure element may comprise an area of cooperation with the return member, comprising a surface for supporting the return member and/or an area for guiding the return member.

In short, the closure element comprises, according to one embodiment of the invention, an area of fixed joining with the first flange, an area for closing off the valve seat and an area for cooperating with the return member.

The filter body advantageously comprises a vessel and a cover comprising means of cooperation between them that are tightly sealed but detachable so as to enable the replacement of the filter cartridge.

The filtering medium can be chosen from the group constituted by: cellulose, especially paper or cardboard, felt, a woven or non-woven, synthetic or non-synthetic porous material, or any other appropriate filtering medium.

The closure element may comprise a polymer material, in particular polyamide. Advantageously, the closure element is made out of incinerable material.

It is also an aspect of the disclosure, in combination with the above, to provide a filter cartridge for the filter assembly as defined here above.

LIST OF FIGURES

Figure 4:
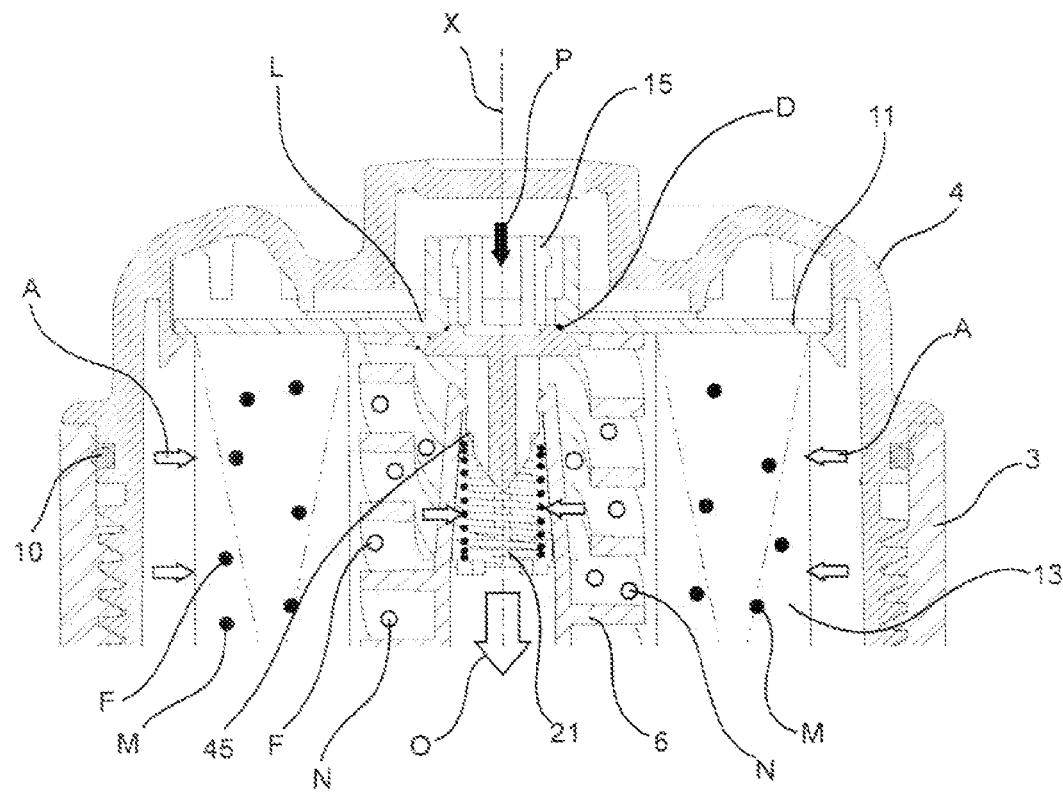
Figure 5:
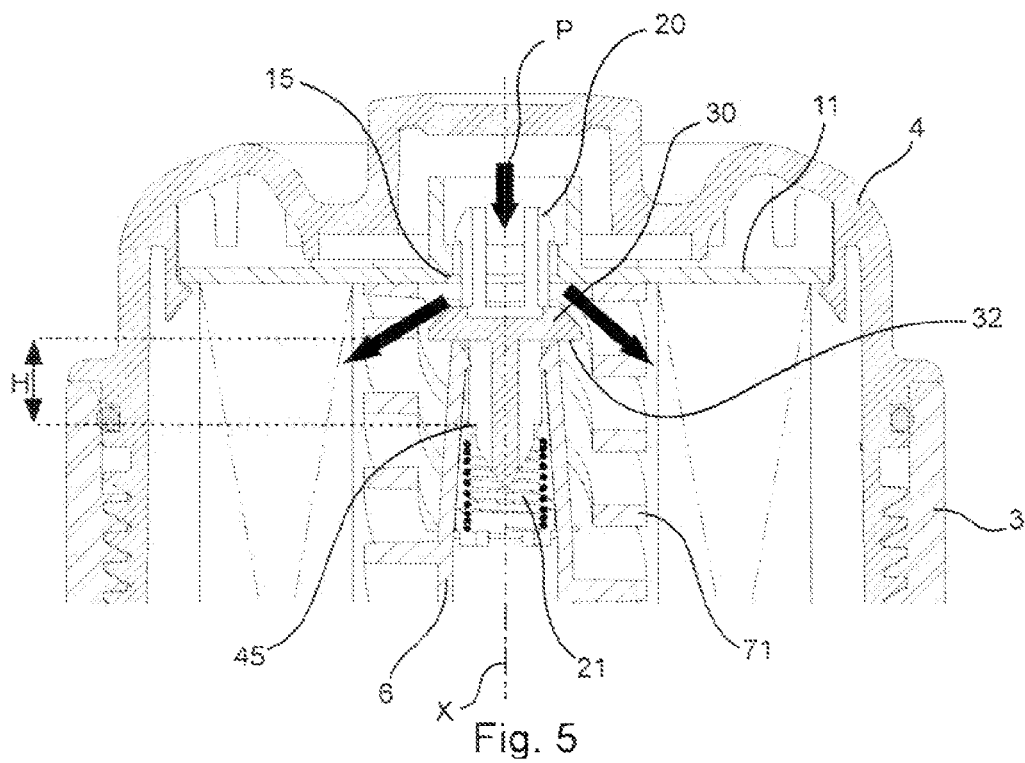
Figure 6:
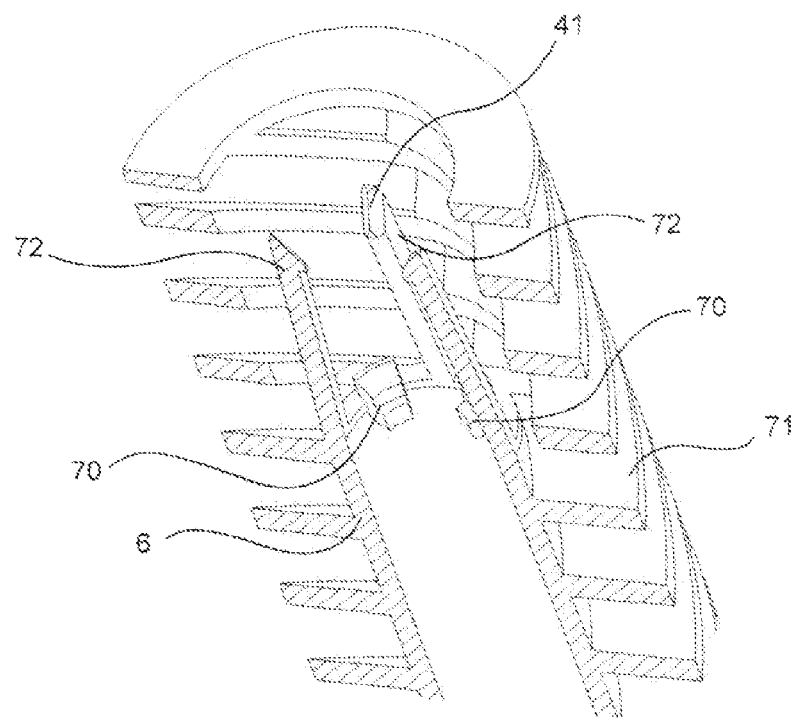
Figure 7:
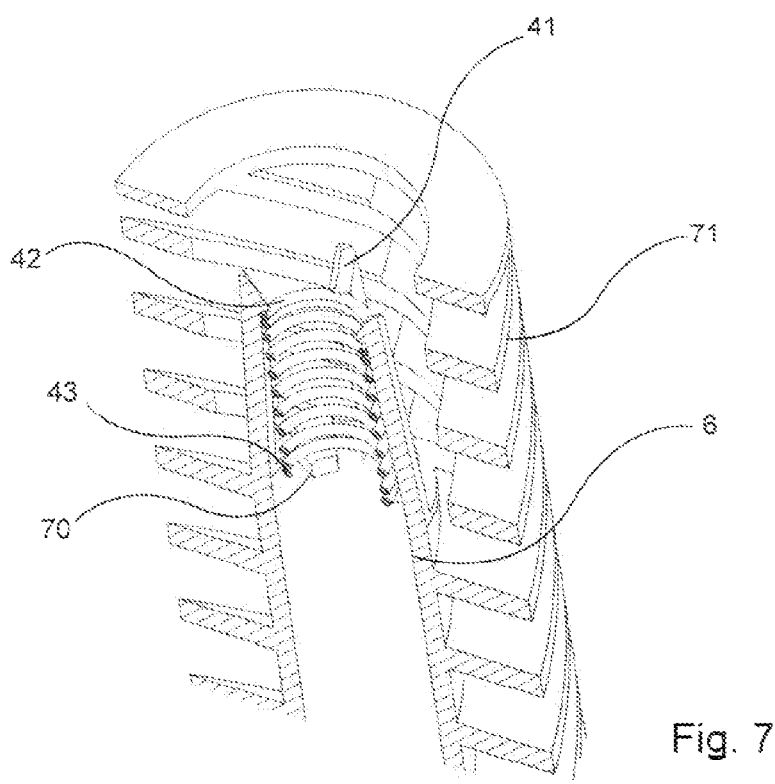

Other features and advantages of the disclosure shall appear more clearly from the following description of embodiments of the invention, given by way of illustratory and non-exhaustive examples and from the appended drawings, of which:

FIG. 1 represents a schematic view in section of a filter assembly compliant with a first embodiment of the disclosure, FIG. 2 illustrates, isolatedly, a schematic view in section of the filter cartridge of the filter assembly of FIG. 1, FIG. 3 is a schematic view in section of a permanent part of the filter assembly of FIG. 1, without the filter cartridge, FIGS. 4 and 5 are a schematic and partial illustration, in section, of the filter assembly of FIG. 1 during its operation, FIG. 6 is a schematic illustration, isolatedly and partially, in section and in perspective, of the tube of the filter assembly of FIG. 1, FIG. 7 is a view similar to FIG. 6 of the return member, positioned moreover in the tube, FIG. 8 is a schematic and partial illustration of a filter assembly seen in section according to a second embodiment of the disclosure, FIG. 9 is a schematic and partial representation of the valve part of the filter assembly of FIG. 8, FIG. 10 represents isolatedly, in a schematic and perspective view seen from the bottom, of the first flange provided with the closure element of the filter assembly of FIG. 8, and FIG. 11 represents isolatedly, in a schematic and perspective view seen from the top, of the first flange provided with the closure element of the filter assembly of FIG. 8.

DETAILED DESCRIPTION OF EMBODIMENTS OF THE INVENTION

FIG. 1 shows a filter assembly 1 for a fluid flowing in a hydraulic motor or apparatus. This filter assembly 1 comprises a filter body 2 comprising a vessel 3 and a cover 4. The filter body 2 demarcates a volume 5 within which the filter assembly 1 comprises a tube 6, in this example a center tube. The filter assembly 1 also has a filter cartridge 7 shown isolatedly in FIG. 2.

The vessel 3 is provided with an internal thread 8 and the cover 4 is provided with an external thread 9 that can be screwed onto the internal thread 8 of the vessel 3 so as to close the filter assembly 1. The tight sealing of the filter assembly 1 is furthermore ensured by at least one ring seal 10, inserted between the cover 4 and the vessel 3. It is thus easy to unscrew the cover 4 and the vessel 3 from the filter body 2 in order to extract the filter cartridge 7, when this cartridge is worn out, to replace it with a new filter cartridge 7.

The filter cartridge 7 has a first flange 11 called an upper flange and a second flange 12 called a lower flange. The filter cartridge 7 furthermore has a filtering medium 13, of a generally cylindrical shape having a tubular cavity 14 to surround the tube 6 as illustrated in FIG. 1. The filtering medium 13 extends longitudinally along a longitudinal axis X between the first flange 11 and the second flange 12. The first flange 11 has a valve seat 15 crossed by an orifice 16 communicating with the tubular cavity 14.

The second flange 12 integrates an O-ring 22 in a housing, forming the tight sealing at the lower part of the filter cartridge 7.

As can be seen in FIGS. 1, 3, 6 and 7, the tube 6 has an external relief feature consisting, in this example, of a plurality of fins 71 tilted to retain the filtering medium 13 while at the same time enabling the passage of fluid.

The tube 6 is fixedly joined to the vessel 3 of the filter body 2 at its lower part, for example by being clipped on or by similar means, the tight sealing being ensured by the presence of seals visible in these figures including the seal 22 in this example.

The filter cartridge 7 comprises in addition a valve closure element 20 fixedly joined to the first flange 11 and capable of cooperating with the valve seat 15. The closure element 20 is thus configured to take two positions, namely a closed position in which the closure element 20 closes off the valve seat 15 and at least one open position in which the closure element 20 enables the passage of fluid through the valve seat 15.

The filter assembly 1 furthermore has a return member 21 formed in this example by a spring, distinct from the filter cartridge 7 and configured to act by biasing the closure element 20 into the closed position.

It must be noted that the filter assembly 1 according to the disclosure comprises a permanent part including the filter body 2, the tube 6 and the return member 21, and a detachable part comprising the filter cartridge 7 including the first and second flanges 11 and 12, the filtering medium 13 and the closure element 20.

Thus, according to the principle of the disclosure, the safety valve formed by the following three elements, namely the valve seat 15, the closure element 20 and the return member 21, is constituted partly by detachable elements forming part of the filter cartridge 7, namely the valve seat 15 and the closure element 20, and partly by permanent elements, namely the return member 21 which remains without being changed during the replacement of the filter cartridge 7.

One advantage of the filter assembly 1 according to the disclosure is that it enables the total replacement of the closure area formed by the contact area between the valve seat 15 and the closure element 20, which can be fouled during the use of the filter assembly 1. This fouled area will be entirely replaced by a clean contact area during the replacement of the filter cartridge 7.

Another advantage of the disclosure lies in the fact that the return member 21 remains permanently without being changed in the filter assembly 1 and is not replaced, so that the number of constituent parts of the filter cartridge 7 is limited. The return member 21 can indeed be fouled but that does not hamper the working of the motor.

The return member 21 can be at least partially made of metal. In this case, the filter cartridge 7, which has no metal part, is incinerable.

In the example, illustrated, the first flange 11 comprises a tubular portion 25, in this example a center tubular portion, at least partially hollow, extending in the example illustrated around an aperture corresponding to the orifice 16. Within this tubular portion 25 and in this aperture, the closure element 20 is retained while being mobile in translation along the longitudinal axis X between a position corresponding to the closed position and a position corresponding to an open position of the valve. The closure element 20 comprises at least one protruding element 26 consisting of a plurality of tabs in the example shown, capable of abutting an inner shoulder 27 extending on the rim of the tubular portion 25, internally.

The closure element 20 furthermore comprises a skirt 30 extending circumferentially outwards, appreciably perpendicularly to the axis X. The skirt 30 has the closing-off surface 31 capable of coming into contact with the valve seat 15 in the closed position of the closure element 20.

As can be seen in FIGS. 3, 6 and 7, the tube 6 has an unattached end 40 at least partially forming an edge 41 extending diametrically as can be seen in FIGS. 6 and 7 towards the interior so as to retain the return member 21, in this case the spring, abutting this edge 41 by its first end 42. It must be noted that the edge 41, in this example, consists of the end of an upward extension herein formed by four rods 72 as illustrated and partially visible in FIGS. 6 and 7 especially. The presence of these rods 72 gives a certain degree of elasticity to this portion of the tube 6. The arrangement could however be otherwise without departing from the framework of the invention.

The opposite end or second end 43 of the return member 21 is held within the tube 6 as illustrated in FIG. 7. In the example illustrated four studs 70 are present on an internal surface of the tube 6, two of these studs being visible in FIGS. 6 and 7, enabling the return member 21 to be held at a lower part, at the second end 43.

In the example illustrated, the skirt 30, in addition to the closing-off surface 31 and opposite this surface, comprises a surface 32 of contact with the edge 41 of the tube 6.

The closure element 20, again in this illustrated example, has a guiding area 35 for the guiding the return member 21. As illustrated, the area for fixedly joining the closure element 20 to the first flange 11 is on a side of the skirt 30 corresponding to the closing-off surface 31 while the guiding area 35 of the return member 21 is on the opposite side of the skirt 30 on the contact surface 32 side.

The closure element 20 also has a supporting surface 45 which can be seen especially in FIGS. 4 and 5, forming in this example a shoulder perpendicular to the longitudinal axis X extending around the guiding area 35. This supporting surface 45 is the contact area, circular in this example, between the closure element 20 and the return member 21.

The closure element 20 also has a pressure area 44, this area being in contact with the fluid tending, by a pressure P, to open the valve and place the closure element 20 in an open position. The pressure area 44 is illustrated in FIG. 2 by a double arrow extending throughout the contact area between the fluid tending to open the valve and the closure element 20. This pressure area 44 in this example, and as seen, extends in a direction essentially perpendicular to the axis X along a diameter corresponding to that of the orifice 16.

In this example, the closure element 20 thus comprises, as illustrated in FIG. 2:

an area I for fixed joining with the first flange 11, this area for fixed joining comprising especially the surface of the closure element 20 forming the pressure area 44;

an area K for cooperating with the return member 21 comprising the guiding area 35 and the supporting surface 45;

between these two areas, a closure area J comprising the skirt 30.

FIGS. 4 and 5 schematically illustrate the working of the safety valve formed by the valve seat 15, the closure element 20 and the return member 21.

FIG. 5 illustrates the case where the safety valve is open, in the case of cold fluid, especially cold oil, the viscosity of which is such that it cannot pass through the filtering medium 13. In this case the cold fluid, through the pressure P which it exerts on the pressure area 44 of the closure element 20 to place this element in a valve-open position, exerts a force so as to flow through. At the end of the service life of the filter cartridge 7, when it is clogged, the closure element 20 also passes into an open position. It must be noted that, in the open position illustrated in FIG. 5, the contact surface 32 comes into contact with the edge 41 of the tube 6 while the supporting surface 45 comes against the return member 21 in the upper part as can be seen. The fluid passes through the open valve as illustrated in this figure.

FIG. 4 illustrates the cartridge in operation, at the end of its surface life. Debris D is present, as illustrated in FIG. 4, around the closing-off surface 31, and this can create a leak L also shown in this figure. The pressure P exerted on the closure element 15 by the fluid is countered by the force exerted by the return member 21 in such a way that, despite the leak L, the closure element 20 is in the closed position. In this configuration, the pressure P does not reach the predetermined pressure threshold to enable the opening of the valve closure element. As illustrated in this figure, a fouled fluid penetrates externally along the arrows A into the filtering medium 30, the fouled fluid being illustrated by dark particles M.

The clean filtered fluid illustrated by the blank particles N then penetrates the tube 6 and flows downwards along the arrow O.

The replacement of the filter cartridge 7 makes it possible again to obtain a clean closing-off surface, without debris D.

It must be noted that the threshold opening pressure, starting from which the closure element 20 opens, can be modulated by widening, to a greater or lesser extent, the diameter R of the pressure area 44 of the closure element 20 seen in FIG. 2. Increasing this diameter reduces the opening threshold pressure needed to open the valve. On the contrary, reducing it increases the opening threshold pressure needed for opening the valve.

Besides, the length H along the longitudinal axis X of the closure element 20, which can be seen in FIG. 5, included between the contact surface 32 and the supporting surface 45, can be modified so as to modulate the threshold pressure needed to enable the opening of the valve, i.e. the shifting of the closure element 20 into an open position. The greater this length H, the greater the threshold pressure for opening the valve.

It must be noted besides that, after the mounting of the filter cartridge 7 in the permanent part of the filter assembly 1, the closure element 20 in this example never reaches the maximum open position illustrated in FIG. 2 when the filter cartridge 7 is not yet mounted on the rest of the filter assembly 1. Indeed, once the filtering cartridge 7 is mounted, the dimensions of the elements are chosen so as to prepare a clearance between the inner shoulders 27 of the first flange 11 and the protruding element 26, because of the retaining feature formed by the edge 41 against the contact surface 32.

FIGS. 8 to 11 show a second embodiment of the disclosure.

In this embodiment, the tube 6 comprises, in an unattached end part 50, a housing 51 configured to house and maintain the return member 21. This housing 51 comprises a bottom wall 52, perpendicular to the axis X, intersecting the tube 6 in its length.

In this example also, the first flange 11 comprises a plurality of apertures 55 and 60. One of these apertures 55, which is a central aperture, enables the retaining of the closure element 20 while at the same time leaving it mobile in translation between a position corresponding to the closed position and a position corresponding to the open position.

Besides, around this aperture 55, there is a plurality of apertures 60 which can be seen especially in FIG. 11, numbering 3 in the example shown, forming the passage of fluid when the closure element 20 is in the open position. These apertures 60 are formed peripherally around the aperture 55.

Also in this example, the skirt 30 comprises, on one side, the closing-off surface 31 and, on the opposite side, the surface 35 of contact with the return member 21.

It must be noted that, in this embodiment, the aperture 55 in the first flange 11 enabling the closure element 20 to be retained, is distinct from the orifices 60 enabling the passage of fluid when there is no closing off, i.e. in the open position.

Throughout the description, the expressions "comprising one" or "including one" must be understood as being synonymous respectively with the expressions "comprising at least one" and "including at least one", unless the contrary is specified.

A filter assembly 1 includes a filter body 2, including vessel 3 and cover 4. A removable filter cartridge 7 is detachably housed in the filter body and defines a clean zone 80 and a dirty zone 82, where fluid to be filtered flows through filter cartridge 7 from dirty zone 82 to clean zone 80. A bypass valve 84 includes a valve seat 15, a movable valve closure element 20 movable between a closed position, FIGS. 1, 4, 9, engaging valve seat 15 and closing the bypass valve, and an open position, FIG. 5, disengaging valve seat 15 and opening the bypass valve to permit fluid flow therethrough from the dirty zone unfiltered to the clean zone. The bypass valve further includes a return member 21 biasing the movable valve closure element 20 to the noted closed position. Fluid pressure in the dirty zone above a designated bypass valve-opening threshold pressure overcomes the bias of return member 21 to move the movable valve closure element 20 to the open position.

Valve seat 15 and movable valve closure element 20 are mounted to the removable filter cartridge 7 and removed therewith upon removal of the removable filter cartridge 7 from the filter body. Return member 21 is mounted to the filter body, e.g. to tube 6 of vessel 3, and remains in the filter body upon removal of removable filter cartridge 7 from the filter body. Bypass valve 84 has a first portion 15, 20 mounted to removable filter cartridge 7 and removable therewith upon removal of the removable filter cartridge 7 from the filter body. Bypass valve 84 has a second portion 21 mounted to the filter body 2 and remaining in the filter body upon removal of the removable filter cartridge 7 from the filter body. The noted first portion of the bypass valve is incinerable. The noted second portion of the bypass valve is non-incinerable. The bypass valve thus has both an incinerable portion and a non-incinerable portion. The incinerable portion is part of the removable filter cartridge and is removable therewith upon removal of the removable filter cartridge from the filter body. The non-incinerable portion is part of the filter body and remains in the filter body upon removal of the removable filter cartridge from the filter body. In one embodiment, the removable filter cartridge 7, the valve seat 15, and the movable valve closure element 20 contain no non-incinerable components. In one embodiment, return member 21 is metal, and in a further embodiment is a metal spring. Removal of removable filter cartridge 7 removes and enables replacement of the total closure area formed by the contact area between valve seat 15 and movable closure element 20.

Removable filter cartridge 7 has a flange 11 having a first surface 86, FIG. 2, facing the dirty zone and a distally oppositely facing second surface 88 facing the clean zone. Flange 11 has the noted aperture 16 therethrough providing the valve seat 15. First surface 86 has the noted tubular portion 25 extending into the dirty zone and having a hollow interior 90 having the noted given cross-sectional area 44 selected to determine the noted designated bypass valve-opening threshold pressure. The noted given cross-sectional area and concordantly the designated bypass valve-opening threshold pressure is selectable without changing the remainder of the filter assembly including filter body 2, removable filter cartridge 7, and bypass valve 84.

In one embodiment, flange 11 has a singular aperture 16 through which movable valve closure element 20 reciprocates between the noted open and closed positions and through which fluid flows from the dirty zone to the clean zone in the noted open position of movable valve closure element 20. In another embodiment, flange 11 has a plurality of apertures, FIGS. 8-11, as noted above, including at least one aperture 55 through which movable valve closure element 20 reciprocates between the noted open and closed positions, and at least another aperture 60 through which fluid flows from the dirty zone to the clean zone in the noted open position of the movable valve closure element 20.

The system provides a method for controlling bypass valve-opening threshold pressure in a filter assembly. The method includes decreasing the bypass valve-opening threshold pressure by increasing the cross-sectional area 44 of hollow interior 90 of tubular portion 25. The method includes increasing the bypass valve-opening threshold pressure by decreasing the cross-sectional area 44 of hollow interior 90 of tubular portion 25.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. Filter assembly for filtering at least one fluid comprising:
    a filter body,
    a tube within the filter body,
    a detachable filter cartridge housed in the filter body and comprising:
        a first flange and a second flange,
        a filtering medium having a tubular cavity to surround the tube and extending between the first and the second flanges, the first flange comprising a valve seat crossed by at least one orifice communicating with the tubular cavity, and
        a valve closure element fixedly joined to the first flange so as to cooperate with the valve seat, the valve closure element being configured to occupy at least two positions, namely a closing position in which the closure element closes off the valve seat and at least one opening position in which the valve closure element enables the passage of fluid through the valve seat,
    a return member distinct from the detachable filter cartridge, configured to act by biasing the valve closure element into the closed position,
    wherein the valve closure element includes a closing-off surface that contacts the valve seat when the valve closure element is in the closing position;
    wherein an area for fixedly joining the valve closure element to the first flange abuts the closing-off surface,
    wherein the tube has an unattached end having an opening at least partially formed by an edge, the edge extending diametrically towards an interior of the tube so as to retain the return member at a first end abutting the edge, and
    wherein the valve closure element includes a contact surface opposite the closing-off surface, the contact surface contacting the edge of the tube when in the at least one opening position.

2. Filter assembly according to claim 1, wherein the first flange comprises an aperture within which the valve closure element is retained while at the same time being mobile in translation between a position corresponding to the closing position and a position corresponding to the at least one opening position of the valve closure element.

3. Filter assembly according to claim 2, wherein the aperture is demarcated by a tubular portion and wherein the area for fixedly joining the valve closure element to the first flange includes a protruding element that comprises a plurality of tabs that abuts an inner shoulder of the tubular portion in a maximum opening position.

4. Filter assembly according to claim 2, wherein the aperture is distinct from said at least one orifice passing through the valve seat and through which the fluid can pass in the at least opening position of the valve closure element.

5. Filter assembly according to claim 1, wherein the valve closure element comprises a skirt having the closing-off surface.

6. Filter assembly according to claim 1, wherein the tube is at least partially hollow and wherein the return member is mounted in the tube.

7. Filter assembly according to claim 1, wherein the return member comprises a spring.

8. Filter assembly according to claim 7, wherein the edge comprises ends of upward extensions formed by a plurality of rods, and wherein an internal surface of the tube enables the return member to be held within the tube at a second end of the return member.

9. Filter assembly according to claim 1, wherein the tube comprises, in an unattached end part, a housing configured to house and hold the return member.

10. Filter assembly according to claim 1, wherein the valve closure element comprises an area of cooperation with the return member, comprising a surface for supporting the return member and/or an area for guiding the return member.

11. Filter assembly according to claim 1, wherein the filtering medium is chosen from the group constituted by: cellulose, felt, a woven or non-woven, and synthetic or non-synthetic porous material.

12. Filter assembly according to claim 1, wherein the valve closure element comprises a polymer material.

13. A filter assembly comprising:
    a filter body;
    a tube within the filter body, the tube having an end having an opening at least partially formed by an edge extending diametrically towards an interior of the tube;

a removable filter cartridge detachably housed in said filter body and defining a clean zone and a dirty zone, wherein fluid to be filtered flows through said removable filter cartridge from said dirty zone to said clean zone;

a bypass valve having an open condition passing fluid flow therethrough from said dirty zone unfiltered to said clean zone, and a closed condition blocking fluid flow therethrough from said dirty zone to said clean zone;

said bypass valve having both an incinerable portion and a non-incinerable portion;

said incinerable portion having a valve seat and a movable closure valve element having a closing-off surface that contacts the valve seat when the bypass valve is in the closed condition, wherein an area for fixedly joining the movable closure valve element to the removable filter cartridge abuts the closing-off surface;

said incinerable portion being part of said removable filter cartridge and removable therewith upon removal of said removable filter cartridge from said filter body;

said non-incinerable portion being part of said filter body and remaining in said filter body upon removal of said removable filter cartridge from said filter body;

the movable closure valve element having a contact surface opposite the closing-off surface, wherein the contact surface contacts the edge of the tube when in the open condition.

14. A filter assembly comprising:
a filter body;
a tube within the filter body, the tube having an unattached end having an opening at least partially formed by an edge extending diametrically towards an interior of the tube;
a removable filter cartridge detachably housed in said filter body and defining a clean zone and a dirty zone, wherein fluid to be filtered flows through said removable filter cartridge from said dirty zone to said clean zone;
a bypass valve having an open condition passing fluid flow therethrough from said dirty zone unfiltered to said clean zone, and a closed condition blocking fluid flow therethrough from said dirty zone to said clean zone;
said bypass valve having a first portion mounted to said removable filter cartridge and removable therewith upon removal of said removable filter cartridge from said filter body;
said bypass valve having a second portion mounted to said filter body and remaining in said filter body upon removal of said removable filter cartridge from said filter body; and
said first portion having a valve seat and a movable closure valve element having a closing-off surface that contacts the valve seat when the bypass valve is in the closed condition, wherein an area for fixedly joining the movable closure valve element to the removable filter cartridge abuts the closing-off surface;
the movable closure valve element having a contact surface opposite the closing-off surface, wherein the contact surface contacts the edge of the tube when in the open condition.

15. The filter assembly according to claim 14 wherein said first portion of said bypass valve is incinerable, and said second portion of said bypass valve is non-incinerable.

16. A filter assembly comprising:
a filter body;
a tube within the filter body, the tube having an unattached end having an opening at least partially formed by an edge extending diametrically towards an interior of the tube;
a removable filter cartridge detachably housed in said filter body and defining a clean zone and a dirty zone, wherein fluid to be filtered flows through said removable filter cartridge from said dirty zone to said clean zone;
a bypass valve comprising:
 a) a valve seat;
 b) a movable valve closure element having a closing-off surface and a contact surface opposite the closing-off surface, the movable valve closure element being movable between a closed position wherein the closing-off surface contacts and engages said valve seat such that said bypass valve is closed, and an open position wherein the closing-off surface disengages said valve seat such that said bypass valve is opened and the contact surface of the movable valve closure element contacts the edge of the tube to permit fluid flow therethrough from said dirty zone unfiltered to said clean zone, wherein an area for fixedly joining the movable valve closure element to the removable filter cartridge abuts the closing-off surface;
 c) a return member biasing said movable valve closure element to said closed position, wherein the return member is retained within the tube by abutting the edge at a first end and wherein fluid pressure in said dirty zone above a designated bypass valve-opening threshold pressure overcomes the bias of said return member to move said movable valve closure element to said open position;
said valve seat and said movable valve closure element being mounted to said removable filter cartridge and removed therewith upon removal of said removable filter cartridge from said filter body;
said return member being mounted to said filter body and remaining in said filter body upon removal of said removable filter cartridge from said filter body.

17. The filter assembly according to claim 16 wherein said removable filter cartridge, said valve seat, and said movable valve closure element contain no non-incinerable components.

18. The filter assembly according to claim 16 wherein said return member is metal.

19. The filter assembly according to claim 16 wherein said return member is a spring.

20. The filter assembly according to claim 16 wherein removal of said removable filter cartridge removes and enables replacement of the total closure area formed by the contact area between said valve seat and said movable closure element.

21. The filter assembly according to claim 16 wherein said removable filter cartridge has a flange with a first surface facing said dirty zone, and a distally oppositely facing second surface facing said clean zone, said flange having an aperture therethrough providing said valve seat, said first flange having a tubular portion having a hollow interior having a given cross-sectional area selected to determine said designated bypass valve-opening threshold pressure.

22. The filter assembly according to claim 21 wherein said tubular portion extends from said first surface of said flange into said dirty zone.

23. The filter assembly according to claim 21 wherein said given cross-sectional area, and concordantly said designated bypass valve-opening threshold pressure, is selectable without changing the remainder of said filter assembly including said filter body, said removable filter cartridge, and said bypass valve.

24. The filter assembly according to claim 21 wherein said flange has a singular said aperture through which said movable valve closure element reciprocates between said open and closed positions and through which fluid flows from said dirty zone to said clean zone in said open position of said movable valve closure element.

25. The filter assembly according to claim 21 wherein said flange has a plurality of apertures, including at least one aperture through which said movable valve closure element reciprocates between said open and closed positions, and at least another aperture through which fluid flows from said dirty zone to said clean zone in said open position of said movable valve closure element.

26. A method for controlling bypass valve-opening threshold pressure in a filter assembly housing having a filter body;
  a tube within the filter body, the tube having an unattached end having an opening at least partially formed by an edge extending diametrically towards an interior of the tube;
  a removable filter cartridge detachably housed in said filter body and defining a clean zone and a dirty zone, wherein fluid to be filtered flows through said removable filter cartridge from said dirty zone to said clean zone;
  a bypass valve comprising:
    a) a valve seat;
    b) a movable valve closure element having a closing-off surface and a contact surface opposite the closing-off surface, the movable valve closure element being movable between a closed position wherein the closing-off surface contacts and engages said valve seat such that said bypass valve is closed, and an open position wherein the closing-off surface disengages said valve seat such that said bypass valve is opened and the contact surface of the movable valve closure element contacts the edge of the tube to permit fluid flow therethrough from said dirty zone unfiltered to said clean zone, wherein an area fixedly joining the movable valve closure element to the removable filter cartridge abuts the closing-off surface;
    c) a return member biasing said movable valve closure element to said closed position, wherein the return member is retained within the tube by abutting the edge at a first end and wherein fluid pressure in said dirty zone above a designated bypass valve-opening threshold pressure overcomes the bias of said return member to move said movable valve closure element to said open position;
wherein said removable filter cartridge has a flange with a first surface facing said dirty zone, and a distally oppositely facing second surface facing said clean zone, said flange having an aperture therethrough providing said valve seat, said flange having a tubular portion having a hollow interior having a given cross-sectional area selected to determine said designated bypass valve-opening threshold pressure;
said method comprising decreasing said bypass valve-opening threshold pressure by increasing said cross-sectional area of said hollow interior of said tubular portion, and increasing said bypass valve-opening threshold pressure by decreasing said cross-sectional area of said hollow interior of said tubular portion.

* * * * *